INVENTOR.
ARCHIE F. BOSCIA

Sept. 19, 1961  A. F. BOSCIA  3,001,133
PHASE DETECTORS

Filed Dec. 24, 1956  2 Sheets-Sheet 2

INVENTOR.
ARCHIE F. BOSCIA
BY
*F. L. Styner*
ATTORNEY

United States Patent Office 3,001,133
Patented Sept. 19, 1961

3,001,133
PHASE DETECTORS
Archie F. Boscia, Rochester, N.Y., assignor to General Dynamics Corporation, Rochester, N.Y., a corporation of Delaware
Filed Dec. 24, 1956, Ser. No. 630,132
2 Claims. (Cl. 324—83)

This invention relates to phase detectors and is particularly directed to means for precisely detecting, defining, and indicating or utilizing the phase of an undulatory signal of sinusoidal form.

Phase measurement is a problem that permeates the entire electrical art and has become particularly critical in such fields as air navigation where the azimuth position of aircraft is established by the phase of a low frequency sine wave radiated omnidirectionally from a ground station, the phase of which varies from point to point of the compass about the station. Peak-riding detectors are inaccurate at best since they must establish the phase of the sine wave by finding the highest point on the relatively flat crest of the loops of the wave. Little success has been had by differentiating and detecting the steepest portion of the wave at or near the nodal point of the wave.

The object of this invention is to provide improved means for detecting and defining the phase of a sine wave.

A specific object of this invention is to provide improved means for detecting the phase of a sine wave in a navigating system.

The objects of this invention are attained by controlling the frequency of a local oscillator by the wave to be examined to produce a sine wave of the same frequency and then adding the locally generating wave to the incoming wave in exact phase opposition to produce a steady voltage of zero resultant voltage. Judiciously placed narrow pass filters eliminate signal components different from the wave under test to insure a phase reading only of the wave under test.

Figure 1:
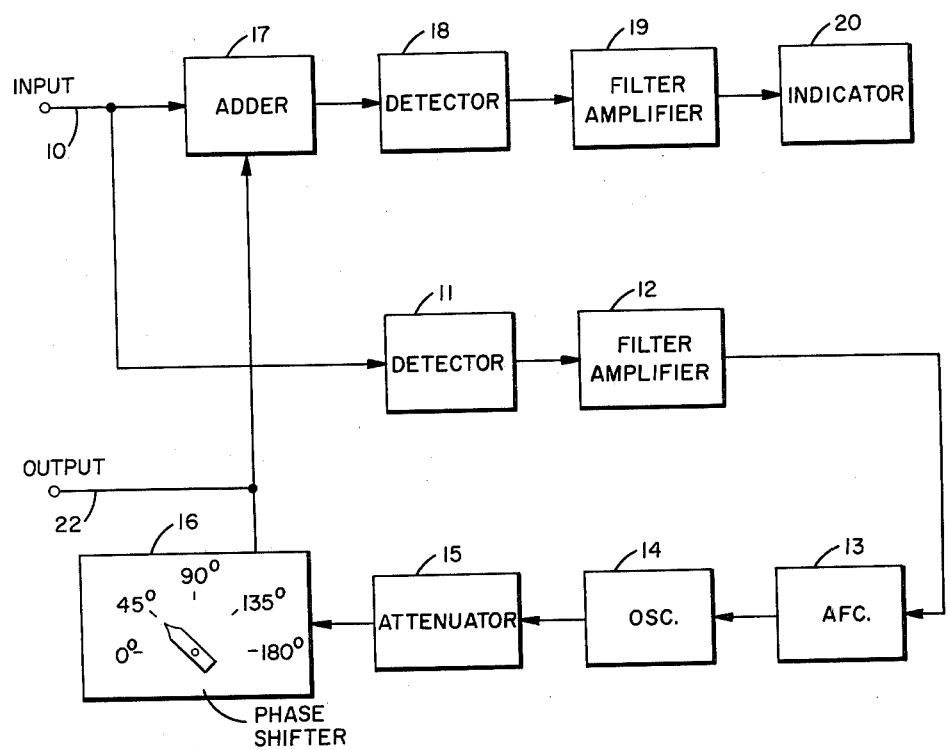
Figure 2:
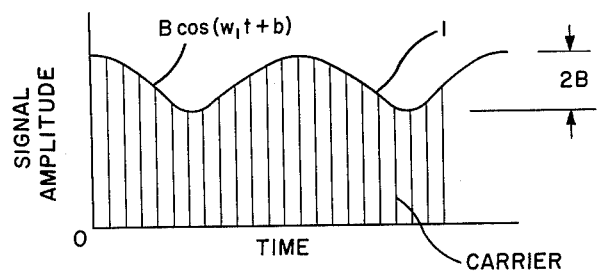
Figure 3:
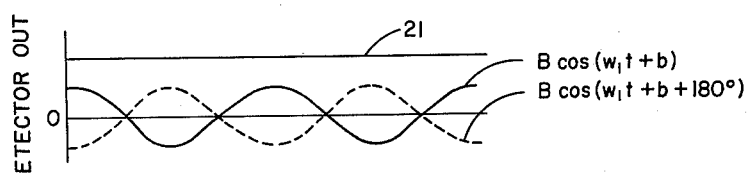
Figure 4:
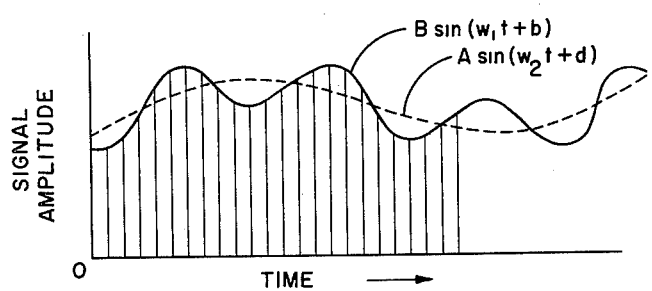
Figure 5:
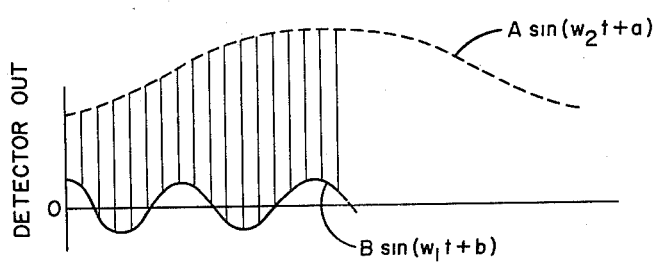

Other objects and features of this invention will become apparent to those skilled in the art by referring to one specific embodiment described in the following specification and shown in the accompanying drawings in which FIG. 1 is a block diagram of the circuits of one phase detector embodying this invention, FIG. 2 is a graph of a sine wave, the phase of which is to be tested, modulated on a high frequency carrier, FIG. 3 is a graph of two sine waves to be added according to this invention, FIG. 4 is a graph of a carrier modulated by two frequency components, one only of which is to be examined by the phase detector of this invention, and FIG. 5 is a graphic addition of two dissimilar signals in the system of this invention.

Let it be assumed that the wave, the phase of which is to be determined, is received as a modulated envelope of a high frequency carrier. A sine wave may be represented as at 1 in FIG. 2 and may be defined by $$B \cos (w_1 t + b)$$

where $w_1$ is the angular frequency of the wave, $t$ is time, $B$ is the amplitude of modulation and $b$ is the phase shift. The problem of defining the phase of such an envelope is made difficult since conventional detectors introduce phase shift in any demodulating process. Where the wave arrives on a carrier, phase shift is introduced in varying amounts by such factors as the modulating frequency, the type of detector circuit used, and the frequency of the carrier. Further, where the carrier comprises pulses of high frequency the detector phase shift is dependent upon the pulse spacing. In the system shown in FIG. 1, it is assumed that a sinusoidally modulated pulsed high frequency carrier is received at the input terminal 10. The amplitude modulated pulse train is divided between two paths. In the first, it is applied to the detector 11, which is designed so that the amplitude variations of the sine wave 1, FIG. 2, are detected. It will be seen that the phase shift in this detector is unimportant and may be ignored. After detection the sine wave is applied to the filter-amplifier 12, the selection circuits being designed to attenuate and exclude all frequencies except $\cos (w_1 t + b)$.

At 14 is shown an oscillator, which is of any well-known type capable of generating a substantially pure sine wave but which is loosely coupled or otherwise so constituted as to be entrained and locked in step with the wave at the output of the filter-amplifier 12. Such frequency control circuits are represented at 13. The output of oscillator 14 is hence of sinusoidal form and of the frequency of the wave received on the carrier at the input 10. The oscillator output wave, however, is of any random phase with respect to the input wave. The amplitude of the sine wave at the output of the oscillator is adjustable by the attenuator 15, and in operation is preferably adjusted to the amplitude of the incoming modulation at 10.

According to the next important feature of this system, the amplitude adjusted wave from the oscillator is adjusted in phase by the phase shifter 16. For the purposes of this description it is contemplated that the phase shifter is manually adjustable, although servo controls may be employed, to bring the oscillator output into exact phase opposition with the input modulation wave at 10. Conveniently, the absolute shift in phase in the circuits of 16, may be indicated on a dial with an adjusting knob keyed to the phase shifting elements. The rotational position of the knob can easily be calibrated in terms of phase shift. The input wave and the phase adjusted wave are combined in the adder 17 so that the two waves exactly cancel each other, and the modulation component, $B \cos (w_1 t + b)$, is eliminated from the output of the adder. After rectification at the detector 18, the combined adder output is passed through the filter-amplifier 19, tuned to pass only $\cos (w_1 t + b)$ if present, just as in the case of filter-amplifier 12. The indicator 20 is of the cathode ray or oscilloscope type, or a voltage meter capable of registering frequencies at least as high as $\cos (w_1 t + b)$.

It can be seen that for the case depicted in FIG. 3 where the sine wave $B \cos (w_1 t + b)$ is added in exact phase opposition to the wave $B \cos (w_1 t + b + 180°)$, the output of the detector 17 is steady and the output of the filter-amplifier 19 is zero. The sensitivity of the system and the exactness with which this condition can be achieved is dependent on the gain of the filter-amplifier 19, which as contemplated by this invention, can and is made very high of the order of several thousands. Again, the exact phase shift which is encountered in such an amplifier, or in any of the components of the system, is not important to the end result. When the attenuator 15 and phase shifter 16 are properly adjusted to produce a zero or steady voltage at the indicator 20, such as steady voltage 21, FIG. 3, it is known that the local wave and the detected wave are in exact phase opposition. Accordingly, the phase at the output terminal 22 connected to the output of the phase shifter is known to be the phase of the incoming wave $B \cos (w_1 t + b)$, plus or minus 180°.

It is also apparent that this system functions properly when there are extraneous signals of different modulation frequencies present on the carrier because the filter-amplifiers 12 and 19 reject all detected modulation frequencies except the one desired, namely $w_1$. Hence, even in the presence of the frequency $w_2$, different from $w_1$, the resulting phase and amplitude at the output 22 represents the true phase and amplitude of the component modulation contributed by the signal $B \cos(w_1 t + b)$. If, for example, the modulation frequency contains two components as shown in FIG. 4, they will add as shown in FIG. 5, but all detected signals applied to the filter-amplifier 19, except the pass frequency, $w_1$, of the filter, would be rejected. Hence, the $w_2$ components would be rejected. Likewise, frequencies of $w_3$, $w_4$, et cetera, would be rejected and would not deteriorate the exact adjustment of the phase shifter 16 to the phase of the desired incoming signal $w_1$.

It is also apparent that the frequency of the carrier or the pulse spacing of the carrier, in case a pulsed high frequency is used, does not affect the end result since the operation of the system depends on adding two modulation signals together in such a way that the resulting signal does not contain any modulation of frequency $w_1$. If there is no modulation present containing $w_1$ components, the phase shift encountered in the detection of $w_1$ does not exist. This is the end result desired.

Many modifications may be made in the arrangement of components of the system of FIG. 1 without departing from the scope of the appended claims. The adders, detectors, phase shifter and filter-amplifiers comprising the components of the system of FIG. 1 may individually assume any of many configurations well known in this art. Nor is the type of component circuit configuration particularly dependent upon the circuits used in the other components. It is accordingly understood that the embodiment shown is illustrative only and not limitive.

What is claimed is:

1. In combination in a system for detecting the phase of a sinusoidal component of a complex wave received from a source, and for isolating at an output terminal said sinusoidal component, said system comprising an oscillator of the free running type adapted to generate a substantially pure sinusoidal wave, said oscillator having a frequency control circuit, two single-frequency selection circuits each designed to attenuate all frequencies except the frequency of the sinusoidal component of said wave, an adder circuit with two input circuits, said input circuits being coupled, respectively, to said source and to the output of said oscillator for comparing said wave and the output wave of said oscillator, a phase-shifting means connected in one of said input circuits for shifting the phase of the wave in said one of said input circuits with respect to the other, indicator means, one of said single-frequency selection circuits being coupled between said adder and said indicator means, the other of said single-frequency selection circuits being coupled between said frequency control circuit of said oscillator and said source so that the phase relation of two substantially pure sinusoidal waves only are indicated by said indicator means, said output terminal being connected to the output of said phase-shifting means.

2. In combination in a system for detecting the phase of the sinusoidal component of a complex wave containing said component, an oscillator for generating a substantially pure sinusoidal wave of the frequency of said component, means responsive to said component of said wave for controlling the frequency of said oscillator coupled to the frequency control circuit of said oscillator and to a source of said complex wave, means for adding said complex wave to the sinusoidal wave of said oscillator, means for adjustably shifting the relative phases of the added waves, indicating means, and a single-frequency selection circuit designed to attenuate and exclude all frequencies except the frequency of said component, said selection circuit being coupled between said adding means and said indicating means so that a fixed and known phase relation can be indicated between said pure sinusoidal wave and said sinusoidal component of said complex wave.

References Cited in the file of this patent

UNITED STATES PATENTS

| | | |
|---|---|---|
| 2,389,948 | Bartels | Nov. 27, 1945 |
| 2,432,214 | Sontheimer | Dec. 9, 1947 |
| 2,489,262 | Buckbee | Nov. 29, 1949 |
| 2,557,581 | Triman | June 19, 1951 |
| 2,625,614 | Schelleng | Jan. 13, 1953 |
| 2,694,794 | Blomqvist | Nov. 16, 1954 |
| 2,756,390 | Albersheim | July 24, 1956 |
| 2,771,581 | Stolzenbach | Nov. 20, 1956 |
| 2,785,377 | McFee et al. | Mar. 12, 1957 |
| 2,793,346 | Shive | May 21, 1957 |
| 2,843,669 | Six | July 15, 1958 |
| 2,857,568 | Hering et al. | Oct. 21, 1958 |
| 2,902,650 | Kaiser | Sept. 1, 1959 |
| 2,913,663 | Cooper | Nov. 17, 1959 |

FOREIGN PATENTS

| | | |
|---|---|---|
| 898,169 | Germany | Nov. 26, 1953 |

OTHER REFERENCES

Journal of Scientific Instruments, October 1944: pages 174–177.